US009071618B1

(12) United States Patent
Pruthi

(10) Patent No.: US 9,071,618 B1
(45) Date of Patent: Jun. 30, 2015

(54) PROVIDING MULTIPLE ACCESS LEVELS TO A SINGLE USER ACCOUNT USING DIFFERENT LOGIN CREDENTIALS

(71) Applicant: Bank of America Corporation, Charlotte, NC (US)

(72) Inventor: Kapil Pruthi, Bothell, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/450,912

(22) Filed: Aug. 4, 2014

(51) Int. Cl.
 *G06F 17/30* (2006.01)
 *H04L 29/06* (2006.01)
 *G06F 21/31* (2013.01)

(52) U.S. Cl.
 CPC ............ *H04L 63/105* (2013.01); *H04L 63/083* (2013.01); *G06F 21/31* (2013.01)

(58) Field of Classification Search
 CPC ...... H04L 63/105; H04L 63/083; G06F 21/31
 USPC .................... 726/5, 3, 4, 15, 19, 26
 See application file for complete search history.

(56) References Cited

U.S. PATENT DOCUMENTS

| | | | |
|---|---|---|---|
| 5,734,831 A * | 3/1998 | Sanders | 709/223 |
| 8,281,372 B1 * | 10/2012 | Vidal | 726/5 |
| 2004/0255152 A1 * | 12/2004 | Kanamori et al. | 713/201 |
| 2006/0167643 A1 * | 7/2006 | Casto et al. | 702/85 |
| 2007/0067625 A1 * | 3/2007 | Jiang et al. | 713/168 |
| 2007/0157028 A1 * | 7/2007 | Lott | 713/182 |
| 2008/0092215 A1 | 4/2008 | Soukup et al. | |
| 2008/0181406 A1 | 7/2008 | Iyer et al. | |
| 2008/0184035 A1 | 7/2008 | Iyer et al. | |
| 2008/0282091 A1 | 11/2008 | Ashok et al. | |
| 2009/0046858 A1 | 2/2009 | Iyer et al. | |
| 2009/0112678 A1 | 4/2009 | Luzardo | |
| 2009/0171910 A1 | 7/2009 | Sarkeshik | |
| 2009/0259588 A1 | 10/2009 | Lindsay | |
| 2010/0070930 A1 * | 3/2010 | Thibault | 715/854 |
| 2010/0287608 A1 | 11/2010 | Khuti et al. | |
| 2012/0032945 A1 | 2/2012 | Dare et al. | |
| 2012/0036220 A1 | 2/2012 | Dare et al. | |
| 2012/0036245 A1 | 2/2012 | Dare et al. | |
| 2012/0036440 A1 | 2/2012 | Dare et al. | |
| 2012/0036442 A1 | 2/2012 | Dare et al. | |
| 2012/0036552 A1 | 2/2012 | Dare et al. | |
| 2012/0144464 A1 | 6/2012 | Fakhrai et al. | |
| 2013/0081126 A1 | 3/2013 | Soukup et al. | |
| 2014/0006977 A1 * | 1/2014 | Adams | 715/758 |
| 2014/0031013 A1 | 1/2014 | Nehushtan | |

(Continued)

*Primary Examiner* — Haresh N Patel
(74) *Attorney, Agent, or Firm* — Banner & Witcoff, Ltd.; Michael A. Springs

(57) ABSTRACT

Methods, systems, apparatuses, and computer-readable media for providing multiple access levels to a single user account using different login credentials are presented. In one or more embodiments, a computing platform may receive an access request to access a user account for which at least two valid passwords have been defined. The request may include one or more login credentials. Based on determining that a password included in the one or more login credentials matches a valid password for the user account, the computing platform may determine an access level to be provided. Subsequently, the computing platform may provide access to the user account based on the determined access level. For example, when a first password is received from a third-party system, read-only access may be provided to the user account, whereas when a second password is received from a user device, full access may be provided to the user account.

33 Claims, 9 Drawing Sheets

(56) References Cited

U.S. PATENT DOCUMENTS

| | | |
|---|---|---|
| 2014/0075493 A1 | 3/2014 | Krishnan et al. |
| 2014/0096196 A1 | 4/2014 | O'Connor et al. |
| 2014/0164776 A1 | 6/2014 | Hook et al. |
| 2014/0256289 A1 | 9/2014 | Nehushtan |
| 2014/0289314 A1 | 9/2014 | Dare et al. |

* cited by examiner

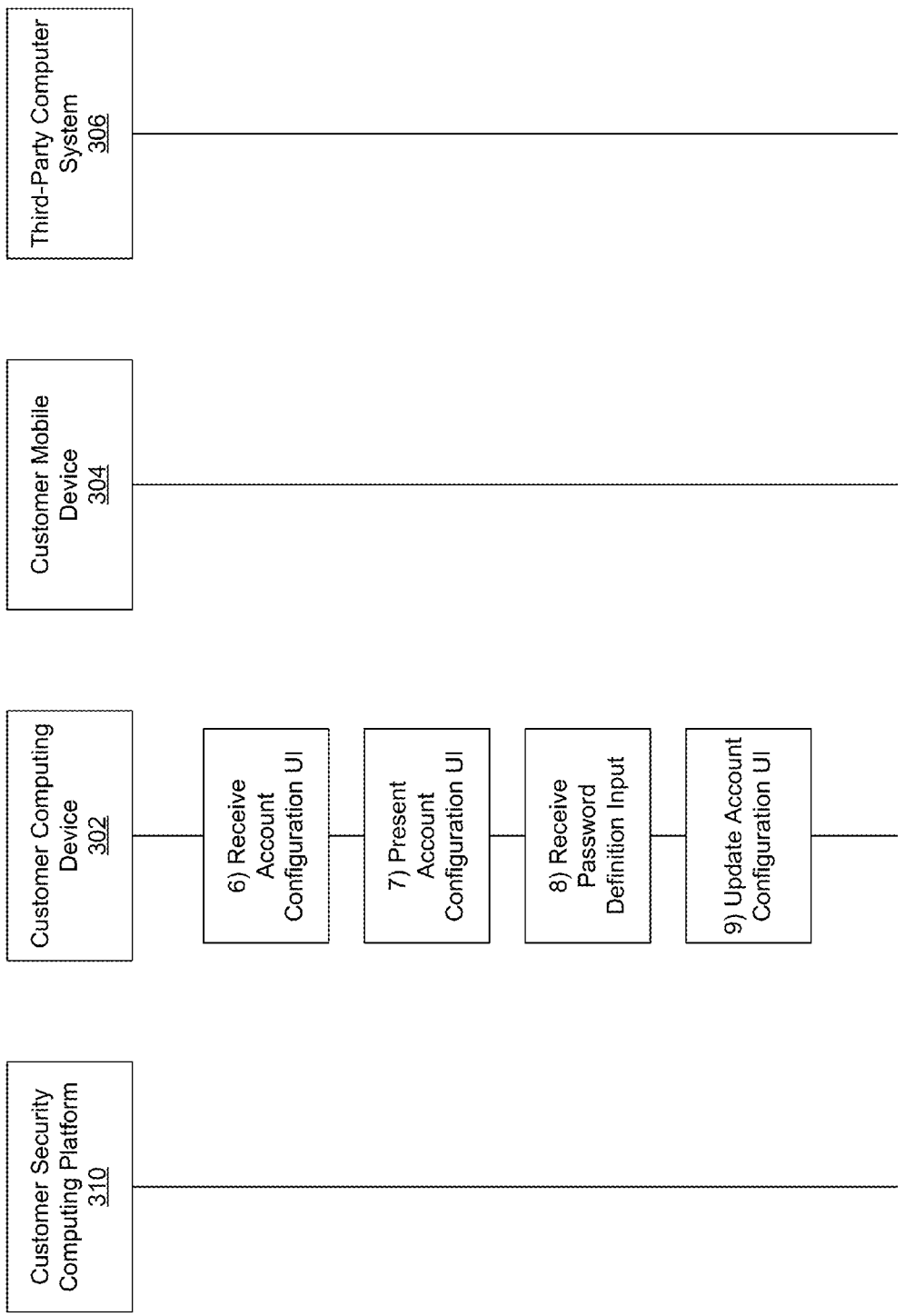

PROVIDING MULTIPLE ACCESS LEVELS TO A SINGLE USER ACCOUNT USING DIFFERENT LOGIN CREDENTIALS

BACKGROUND

Aspects of the disclosure relate to computer hardware and software. In particular, one or more aspects of the disclosure generally relate to computer hardware and software for providing multiple access levels to a single user account using different login credentials.

Large organizations, such as financial institutions, may serve many customers, and increasingly, customers are using computing devices, including mobile computing devices, to interact with organizations about the products and/or services offered by such organizations. Some large organizations may even provide specialized websites and/or customer portals for their customers that allow customers to view and/or purchase various products and/or services online, conduct transactions, and view and/or manage one or more accounts. While large organizations may take many steps to ensure the security of customer information and/or customer accounts, these organizations may wish to continue pursuing ever greater levels of security in protecting customer information and/or customer accounts. In some instances, however, risks to the security of customer information and/or customer accounts may arise simply from providing these specialized websites, providing customer portals, and/or providing other ways of accessing information online.

SUMMARY

Aspects of the disclosure relate to various systems and techniques that provide effective, efficient, scalable, and convenient ways of increasing the security of customer information and customer accounts, particularly in ways that allow customers to have more control over the ways in which their information may be accessed. For example, some aspects of the disclosure allow a customer to define different login credentials for their individual user account. Different access levels may then be assigned to the different login credentials, such that the customer can have full access to their user account in some instances, while allowing other authorized individuals, entities, or services to have full or limited access to their user account in other instances.

In the online banking context, for example, aspects of the disclosure may enable a customer of a financial institution to define a first password that may provide full access to their online banking account and a second password that may provide read-only access and/or otherwise limited access to their online banking account. Once these passwords have been defined, the first password may be used by the customer himself or herself for his or her own personal use. Additionally, the second password may be shared by the customer with a third party, such as the customer's accountant, and/or may be shared by the customer with a third party system, such as third-party financial planning and/or management software, tax software, and/or the like.

In accordance with one or more embodiments, a customer security computing platform having at least one processor, a memory, and a communication interface may receive, by the at least one processor, via the communication interface, from a computing device, an access request to access a user account for which at least two valid passwords have been defined, and the access request may include one or more login credentials. Subsequently, the customer security computing platform may determine whether a password included in the one or more login credentials matches a valid password of the at least two valid passwords which have been defined for the user account. Based on determining that the password included in the one or more login credentials matches a valid password of the at least two valid passwords which have been defined for the user account, the customer security computing platform may determine, based on the password included in the one or more login credentials, an access level to be provided. Then, the customer security computing platform may provide access to the user account based on the determined access level.

In some embodiments, a first valid password of the at least two valid passwords may be associated with a first access level, and a second valid password of the at least two valid passwords may be associated with a second access level different from the first access level. Additionally or alternatively, the at least two valid passwords may be associated with a single username linked to the user account, and the username may also be included in the one or more login credentials. In some instances, the user account may be associated with a customer portal that is provided by an organization operating the customer security computing platform. In other instances, the user account may be associated with a customer portal that is provided by a financial institution operating the customer security computing platform.

In some embodiments, providing access to the user account based on the determined access level may include causing at least one online banking user interface to be presented. In some instances, read-only access may be provided via the at least one online banking user interface based on the password included in the one or more login credentials. The read-only access may, for example, allow account information to be presented via the at least one online banking user interface and may prevent one or more transactions from being conducted via the at least one online banking user interface. In some instances, the read-only access may be provided to a financial planning system provided by an organization different from the financial institution.

In other instances, full access may be provided via the at least one online banking user interface based on the password included in the one or more login credentials. The full access may, for example, allow account information to be presented via the at least one online banking user interface and may allow one or more transactions to be conducted via the at least one online banking user interface, such as one or more transactions in which funds may be transferred between financial accounts via the online banking user interface. In addition, the full access may be provided to a computer system used by an authorized user of the user account, such as the customer of the financial institution himself or herself.

BRIEF DESCRIPTION OF THE DRAWINGS

The present disclosure is illustrated by way of example and not limited in the accompanying figures in which like reference numerals indicate similar elements and in which:

FIGS. 4A-4D depict an illustrative event sequence for providing multiple access levels to a single user account using different login credentials in accordance with one or more example embodiments;

GLOSSARY

Figure 1:
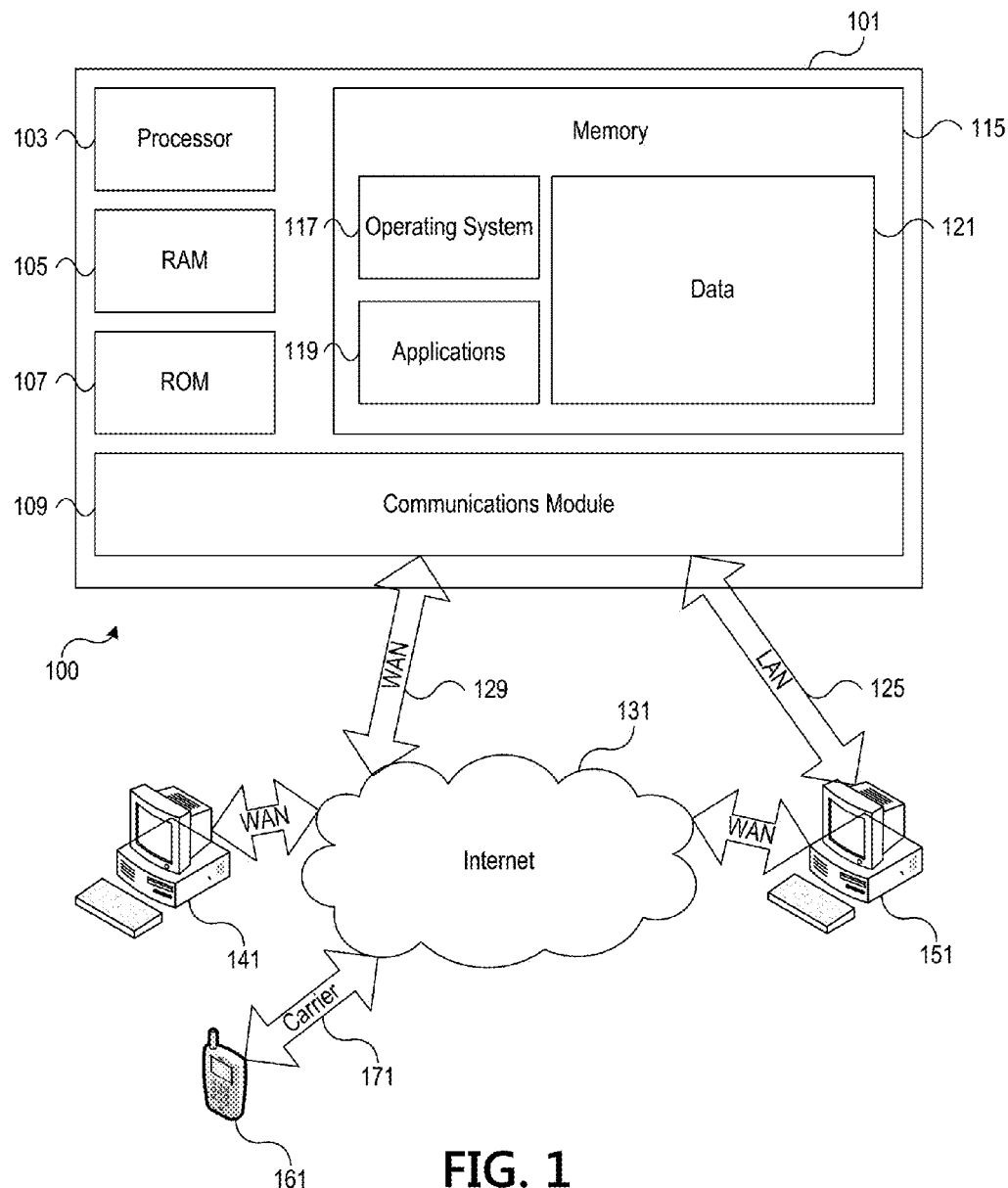
FIG. 1 depicts an illustrative operating environment in which various aspects of the disclosure may be implemented in accordance with one or more example embodiments.

The following glossary provides definitions for several terms used in the disclosure.

In accordance with one or more aspects of the disclosure, a "user account" refers to a collection of information that is maintained in connection with a relationship between an organization, system, or entity and a customer, person, or entity that has been, is, and/or will be authorized to access, view, and/or otherwise use any and/or all of the information included in the collection of information.

In accordance with one or more aspects of the disclosure, an "access level" refers to the one or more rights, privileges, permissions, authorities, and/or functions that are granted, given, and/or otherwise provided to a user, person, or entity. Such rights, privileges, permissions, authorities, and/or functions may be granted, given, and/or otherwise provided to such a user, person, or entity in connection with the user, person, or entity accessing and/or using a user account and/or information that may be maintained in connection with a user account.

In accordance with one or more aspects of the disclosure, an "access request" refers to one or more instructions and/or other information requesting one or more recipients of the access request to provide information and/or perform one or more functions. For example, an access request may include information that defines and/or includes a request to access, view, and/or use a user account and/or a system which may store and/or maintain information associated with such a user account. In some instances, an access request may include various credentials that are provided to facilitate identification of and/or authentication of the user, person, or other entity sending and/or otherwise submitting the access request. The one or more credentials that may, for instance, be included in and/or with an access request include a username, password, a unique token dynamically generated for one-time use, biometric information, location information, and/or other information that may be used in identifying and/or authenticating the user, person, or other entity supplying the credentials.

In accordance with one or more aspects of the disclosure, an "online banking user interface" refers to a graphical user interface and/or a collection of graphical user interfaces via which information associated with a financial institution is presented, accessed, viewed, interacted with, provided, and/or otherwise used. In some instances, an online banking user interface may, for example, be presented on and/or as a part of a website, webpage, portal, and/or other interface that may be electronically communicated and/or displayed to one or more users. Additionally or alternatively, an online banking user interface may include information associated with one or more bank accounts and/or one or more user accounts that are maintained by and/or are otherwise associated with a financial institution.

In accordance with one or more aspects of the disclosure, a "mobile banking user interface" refers to an online banking user interface that is configured to be presented on and/or is presentable on a mobile computing device, such as a laptop computer, tablet computer, smart phone, wearable computing device, and/or other mobile device. In some instances, a mobile banking user interface may include the same features of an online banking user interface, while in other instances, a mobile banking user interface may include one or more different features than an online banking user interface. For example, a mobile banking user interface may include one or more controls and/or other user interface elements that are designed, selected, and/or configured for optimal presentation, display, and/or use on a mobile computing device and/or on a touch-sensitive display screen of such a mobile computing device.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
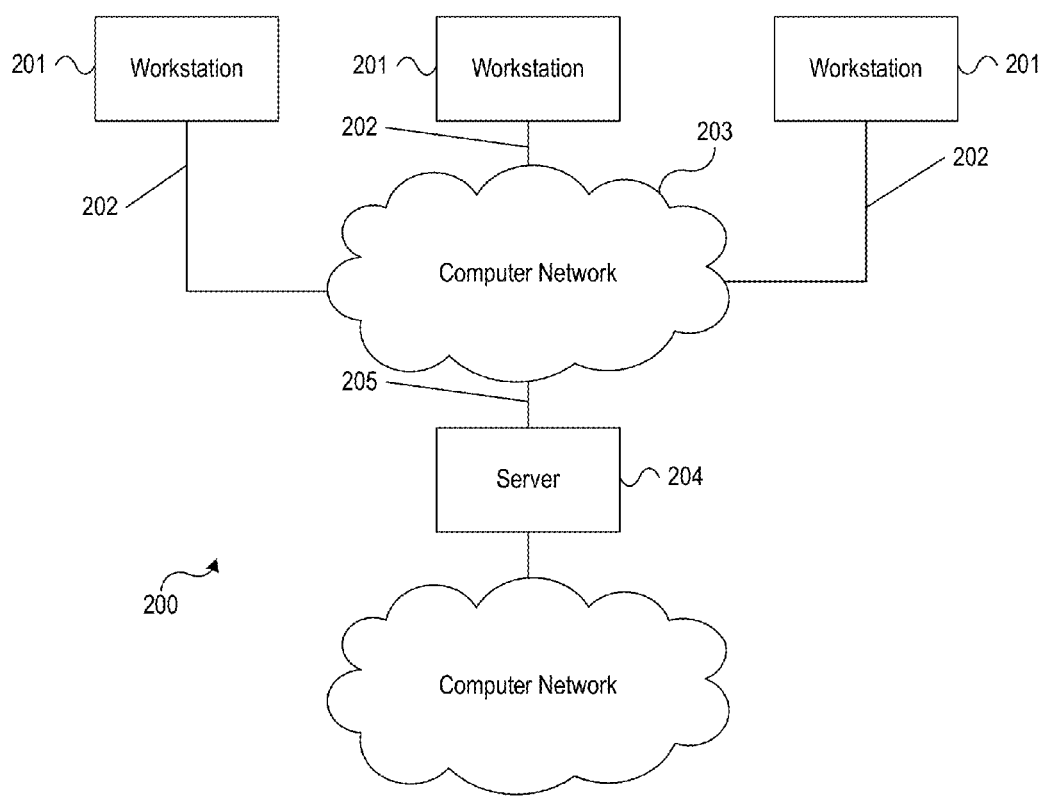
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
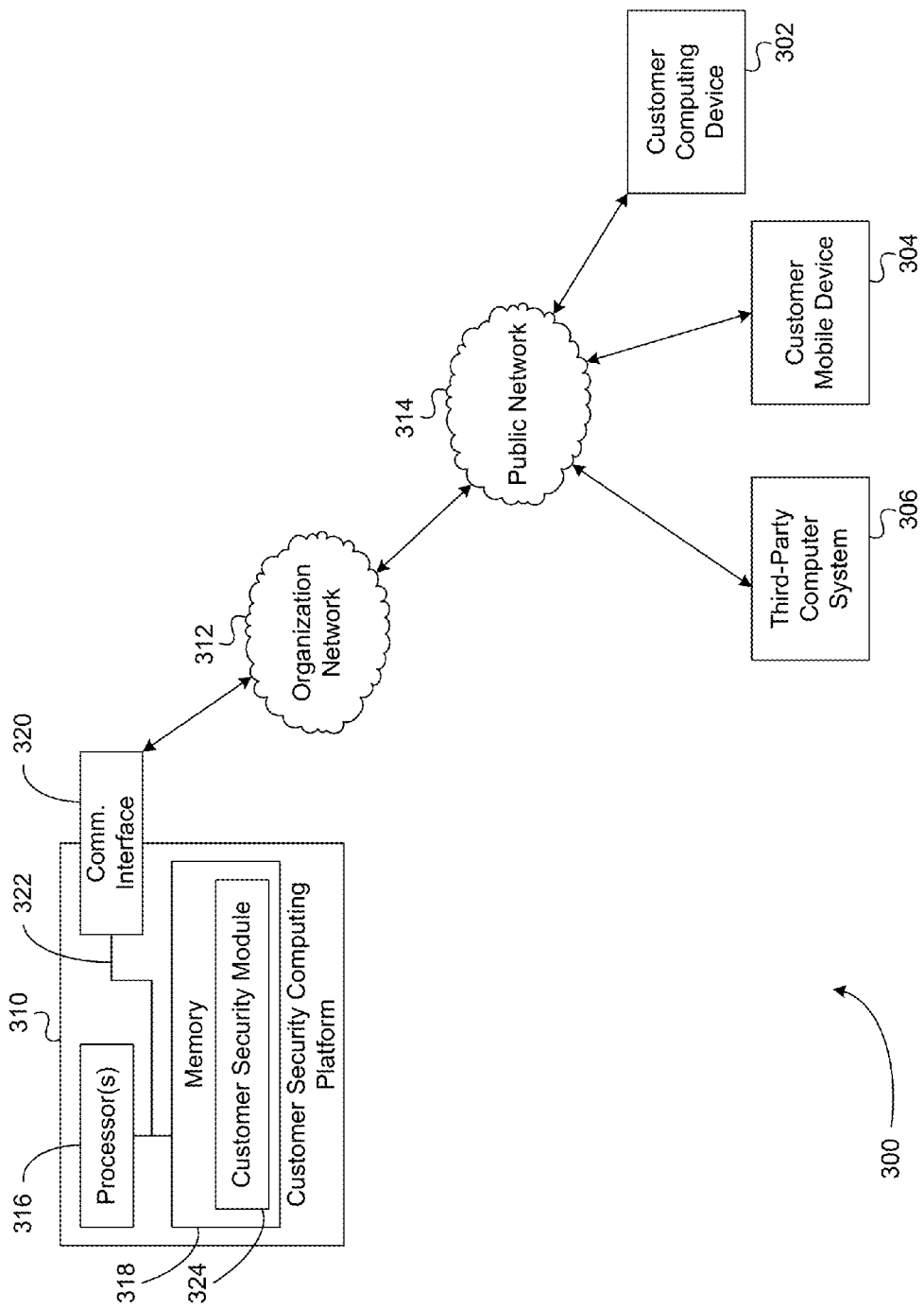
FIG. 3 depicts an illustrative computing environment for providing multiple access levels to a single user account using different login credentials in accordance with one or more example embodiments.

FIG. 3 depicts an illustrative computing environment for providing multiple access levels to a single user account using different login credentials in accordance with one or more example embodiments. Referring to FIG. 3, computing environment 300 may include one or more computing devices. For example, computing environment 300 may include a customer computing device 302 (which may, e.g., be used by a customer of an organization, such as a financial institution, as discussed below), a customer mobile device 304 (which may, e.g., also be used by a customer of an organization, such as a financial institution, as discussed below), and a third-party computer system 306 (which may, e.g., be used by and/or operated by an individual, organization, or other entity different from the financial institution and different from the customer of the financial institution identified in the previous examples, as discussed below). Customer computing device 302, customer mobile device 304, and third-party computer system 306 may be any type of computing device capable of receiving a user interface, receiving input via the user interface, and communicating the received input to one or more other computing devices. For example, customer computing device 302, customer mobile device 304, and third-party computer system 306 may be a desktop computer, laptop computer, tablet computer, smart phone, or the like. Computing environment 300 also may include one or more computing platforms. For example, computing environment 300 may include customer security computing platform 310. Customer security computing platform 310 may include one or more computing devices configured to perform one or more of the functions described herein. For example, customer security computing platform 310 may include one or more computers (e.g., laptop computers, desktop computers, servers, server blades, or the like).

Computing environment 300 also may include one or more networks, which may interconnect one or more of customer computing device 302, customer mobile device 304, third-party computer system 306, and customer security computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, customer security computing platform 310 may be associated with an organization (e.g., a financial institution), and organization network 312 may be associated with and/or operated by the organization, and may include one or more networks (e.g., LANs, WANs, VPNs, or the like) that interconnect customer security computing platform 310 and one or more other computing devices and/or computer systems that are used by, operated by, and/or otherwise associated with the organization. Public network 314 may connect organization network 312 and/or one or more computing devices connected thereto (e.g., customer security computing platform 310) with one or more networks and/or computing devices that are not associated with the organization. For example, customer computing device 302, customer mobile device 304, and third-party computer system 306 might not be associated with an organization that operates and/or is associated with organization network 312, and public network 314 may include one or more networks (e.g., the Internet) that connect customer computing device 302, customer mobile device 304, and third-party computer system 306 to organization network 312 and/or one or more computing devices connected thereto (e.g., customer security computing platform 310).

Customer security computing platform 310 may include one or more processor(s) 316, memory 318, communication interface 320, and data bus 322. Data bus 322 may interconnect processor(s) 316, memory 318, and/or communication interface 320. Communication interface 320 may be a network interface configured to support communication between customer security computing platform 310 and organization network 312, or one or more sub-networks thereof. Memory 318 may include one or more program modules comprising instructions that when executed by the processor(s) 316 cause customer security computing platform 310 to perform one or more functions described herein. For example, memory 318 may include customer security module 324, which may comprise instructions that when executed by processor(s) 316 cause customer security computing platform 310 to perform one or more functions described herein.

Figure 4A:
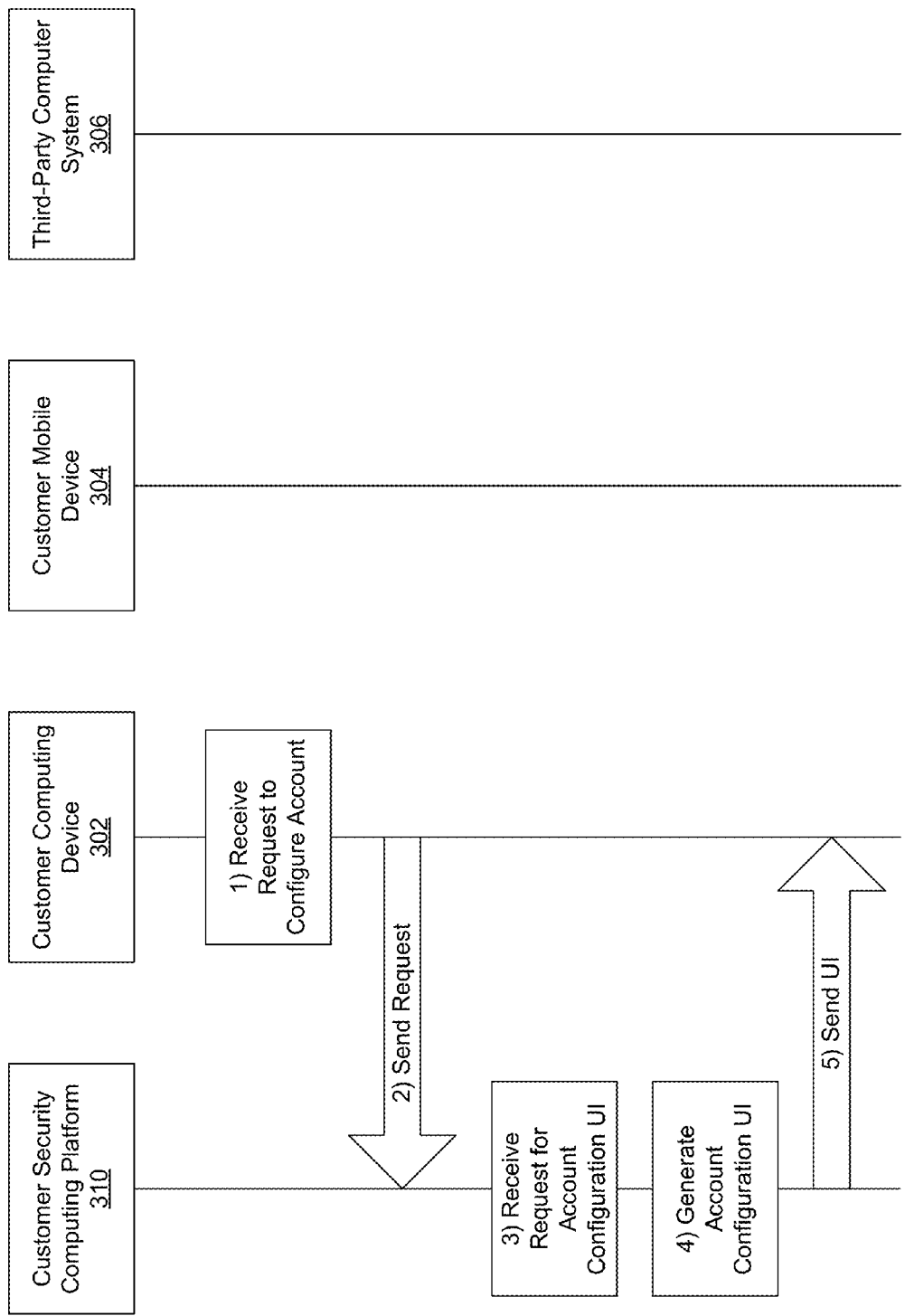

FIGS. 4A-4D depict an illustrative event sequence for providing multiple access levels to a single user account using different login credentials in accordance with one or more example embodiments. Referring to FIG. 4A, at step 1, customer computing device 302 may receive a request to configure a user account. Such a request may, for example, be received as user input (e.g., a menu selection or other command that may be received via a graphical user interface presented by customer computing device 302) from a user of customer computing device 302. At step 2, customer computing device 302 may send a request for an account configuration interface to customer security computing platform 310 (e.g., in response to receiving the request to configure the user account and/or otherwise based on the request received at step 1). At step 3, customer security computing platform 310 may receive, from customer computing device 302, the request for the account configuration interface.

At step 4, customer security computing platform 310 may generate an account configuration user interface (e.g., in response to receiving the request for the account configuration interface and/or otherwise based on the request received at step 3). Such an account configuration user interface may, for example, include one or more fields, controls, and/or other elements that may allow one or more aspects of a user account to be configured, as discussed below. At step 5, customer security computing platform 310 may send the generated account configuration user interface to customer computing device 302.

At step 6, customer computing device 302 may receive the account configuration user interface from customer security computing platform 310. At step 7, customer computing device 302 may present the account configuration user interface. In presenting the account configuration user interface, customer computing device 302 may, for example, display, cause to be displayed, and/or otherwise present a graphical user interface similar to graphical user interface 500, which is illustrated in FIG. 5.

Figure 5:
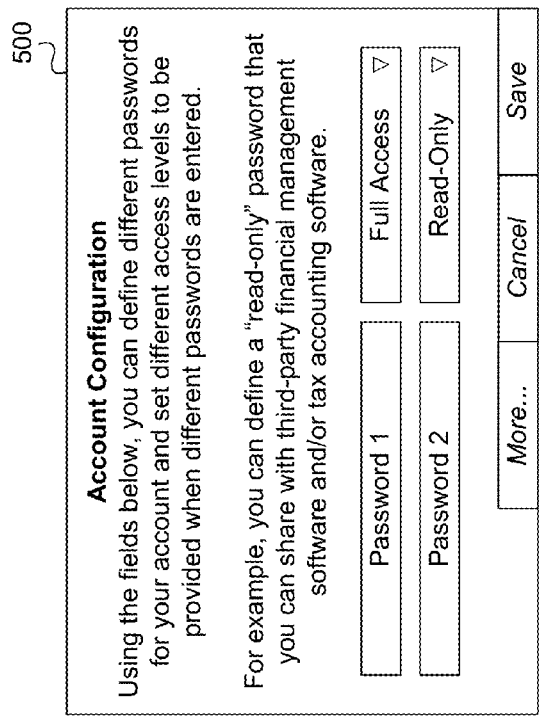
FIG. 5 depicts an example graphical user interface for configuring user account settings in accordance with one or more example embodiments.

As seen in FIG. 5, graphical user interface 500 may include one or more fields, controls, and/or other elements that may allow one or more aspects of a user account to be configured. For example, graphical user interface 500 may include one or more fields, controls, and/or other elements that may allow one or more passwords and/or other login credentials to be defined and/or otherwise set for a user account. Additionally or alternatively, graphical user interface 500 may include one or more fields, controls, and/or other elements that may allow an access level to be assigned to and/or otherwise associated with each of the one or more passwords.

Referring to FIG. 4B, at step 8, customer computing device 302 may receive password definition input. Such password definition input may, for example, be received via the account configuration user interface (e.g., graphical user interface 500) presented at step 7. In some instances, the password definition input may include one or more passwords and/or other login credentials to be defined and/or otherwise set for a user account that is linked to and/or otherwise associated with the user of customer computing device 302. Additionally or alternatively, the password definition input may include one or more access levels to be assigned to and/or otherwise associated with the one or more passwords and/or other login credentials that are defined for and/or otherwise set for the user account. As illustrated below, by allowing the user of customer computing device 302 to set multiple passwords for his or her user account (e.g., via the account configuration user interface), customer security computing platform 310 and/or an organization operating customer security computing platform 310 may enable the user of customer computing device 302 to define a first password for the user's own personal use that provides full access to his or her user account, as well as a second password which provides limited access to the user's user account (e.g., read-only access) and which the user can share with other individuals and/or entities to provide them with such limited access to the user's user account and/or to otherwise serve the user's purposes.

Figure 6:
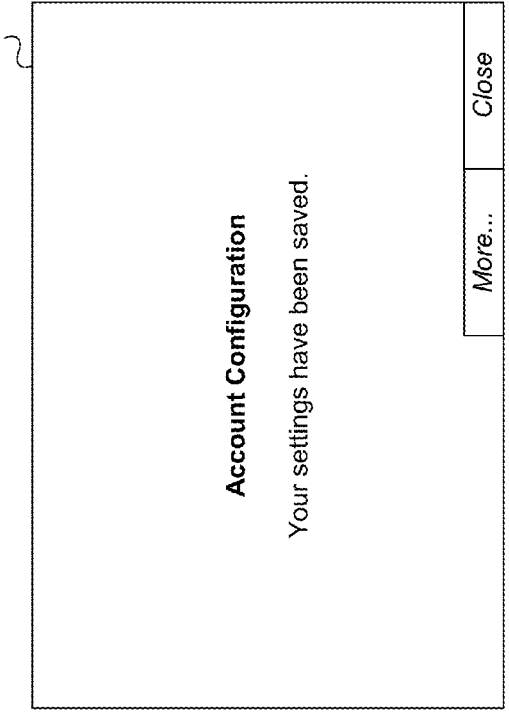
FIG. 6 depicts another example graphical user interface for configuring user account settings in accordance with one or more example embodiments.

At step 9, customer computing device 302 may update the account configuration user interface (e.g., in response to the password definition input and/or otherwise based on the input received at step 8). In updating the account configuration user interface, customer computing device 302 may, for example, display, cause to be displayed, and/or otherwise present a graphical user interface similar to graphical user interface 600, which is illustrated in FIG. 6. As seen in FIG. 6, graphical user interface 600 may include one or more fields, controls, and/or other elements that may allow one or more aspects of a user account to be configured. If, for example, the user of customer computing device 302 has defined and/or otherwise set one or more passwords, access levels, and/or other account information using the account configuration user interface (e.g., at steps 7 and 8), then the updated account configuration user interface presented at step 9 may include information indicating the settings defined by the user of customer computing device 302 have been saved.

Figure 4C:
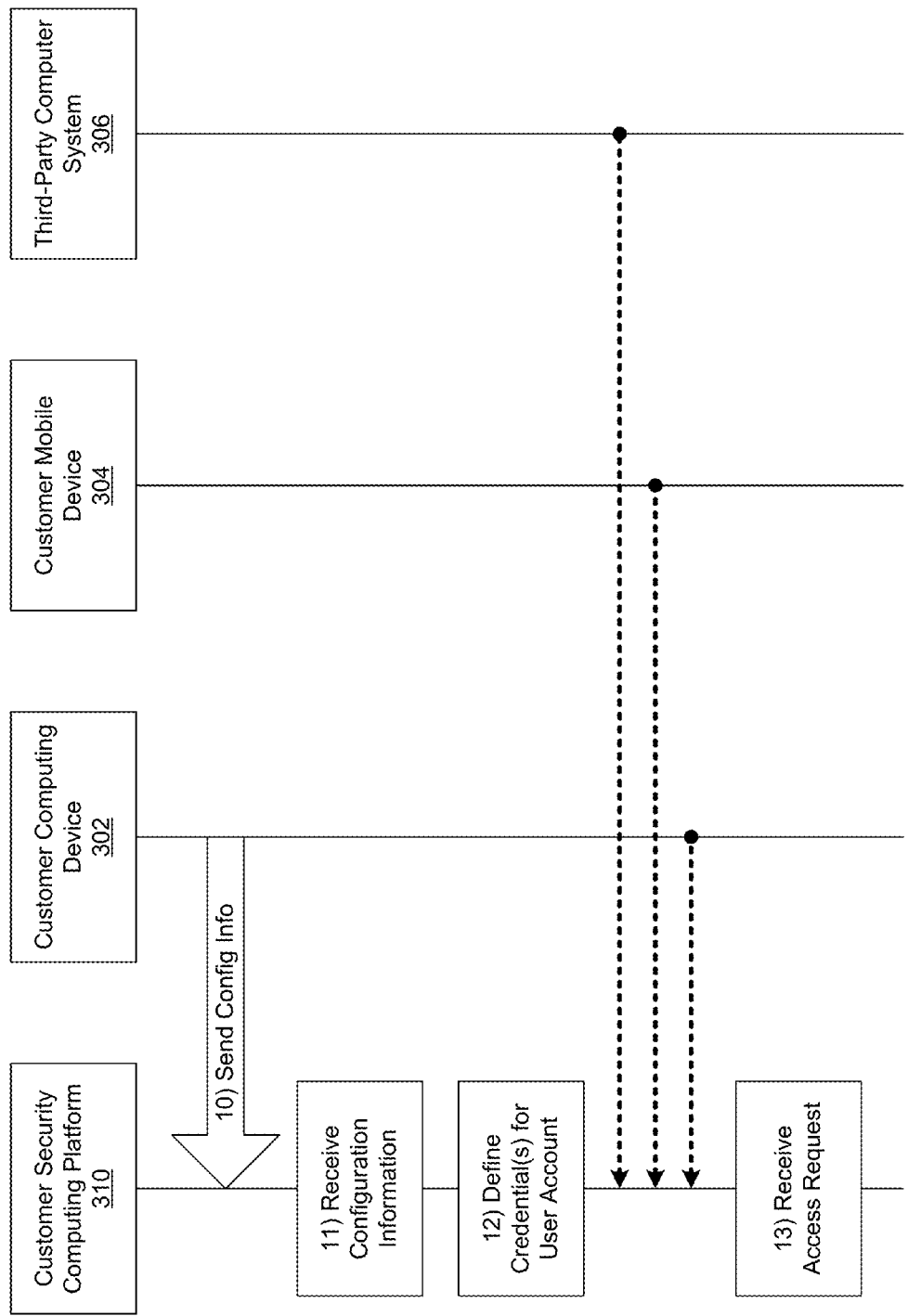
Figure 4D:
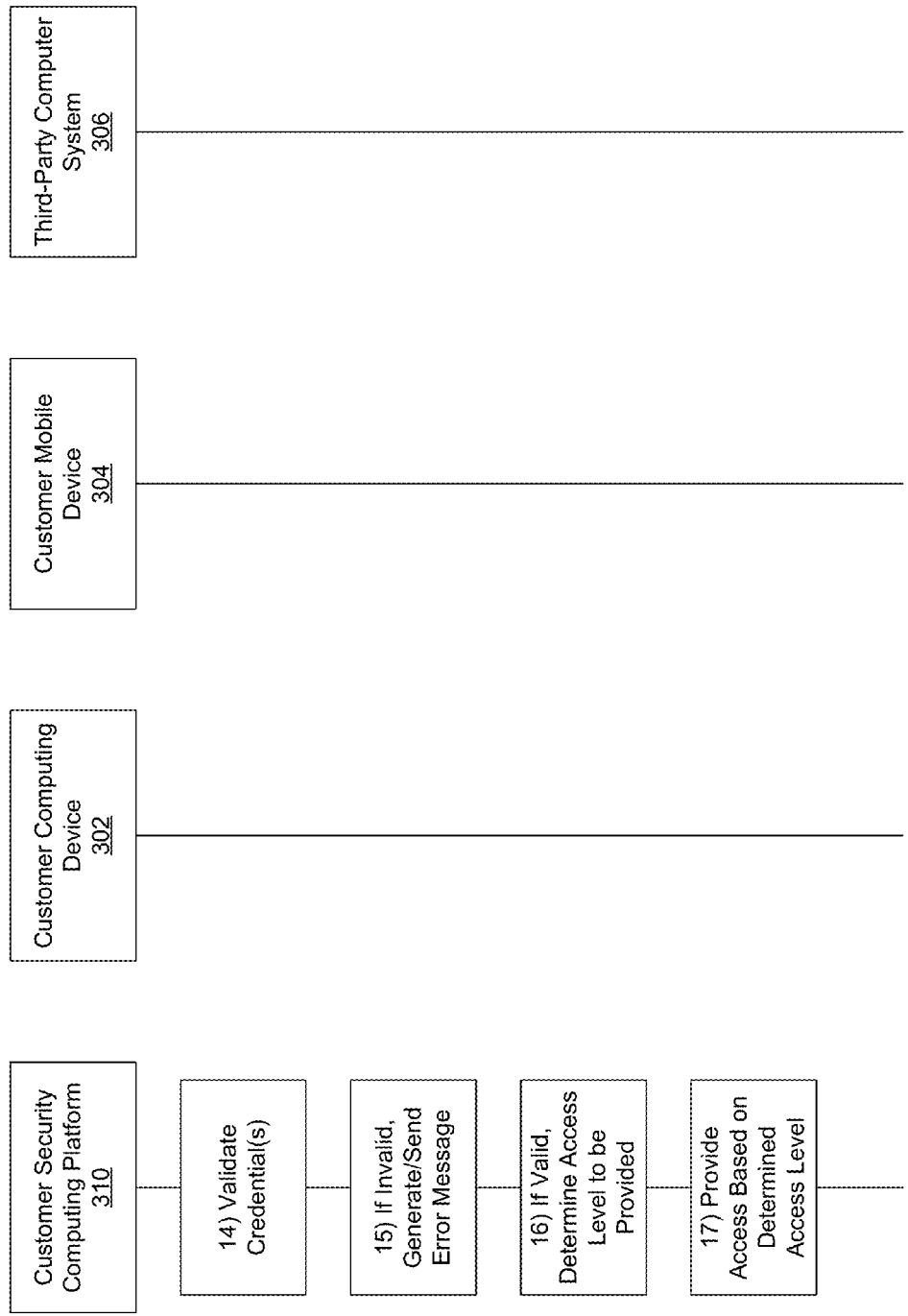

Referring to FIG. 4C, at step 10, customer computing device 302 may send account configuration information to customer security computing platform 310. Such account configuration information may, for example, include the password definition input received at step 8 and/or may otherwise include information that is based on and/or associated with input received at step 8. In some instances, the account configuration information may, for example, include information defining at least two passwords for a user account that is linked to and/or otherwise associated with the user of customer computing device 302.

At step 11, customer security computing platform 310 may receive the configuration information from customer computing device 302. At step 12, customer security computing platform 310 may define one or more credentials for a user account that is linked to and/or otherwise associated with the user of customer computing device 302. The one or more credentials for the user account may, for example, be defined based on the configuration information (e.g., as received from customer computing device 302 at step 11). In some instances, in defining one or more credentials for a user account that is linked to and/or otherwise associated with the user of customer computing device 302, customer security computing platform 310 may define at least two passwords for the user account, which may include a first password that has been assigned to and/or otherwise associated with a first access level (e.g., full access) and a second password that has been assigned to and/or otherwise associated with a second access level different from the first access level (e.g., read-only access).

At step 13, customer security computing platform 310 may receive an access request. For example, at step 13, customer security computing platform 310 may receive, via communication interface 320, from a computing device (e.g., customer computing device 302, customer mobile device 304, third-party computer system 306), an access request to access a user account for which at least two valid passwords have been defined. For instance, the access request may be and/or include a request to access the user account for which one or more credentials were defined at step 12. In some instances, the access request (which may, e.g., be received by customer security computing platform 310 at step 13) may include information identifying the user account for which access is requested, such as an account number, an account identifier, and/or other information. In addition, the access request received by customer security computing platform 310 at step 13 may include one or more login credentials, such as a username, a password, and/or one or more other login credentials, such as one or more tokens, biometrics, and/or the like. Additionally or alternatively, the access request received by customer security computing platform 310 at step 13 may be received from a computing device, such as customer computing device 302, customer mobile device 304, or third-party computer system 306, as illustrated in FIG. 4C, or any other computing device.

At step 14, customer security computing platform 310 may validate one or more login credentials included in and/or otherwise associated with the access request received by customer security computing platform 310 at step 13. In validating the one or more login credentials, customer security computing platform 310 may, for example, determine whether a password included in the one or more login credentials matches a valid password of the at least two valid passwords which have been defined for the user account.

If customer security computing platform 310 determines, at step 14, that the one or more login credentials included in and/or otherwise associated with the access request received by customer security computing platform 310 at step 13 are invalid, then at step 15, customer security computing platform 310 may generate and/or send an error message (e.g., to the computing device from which the access request was received). For example, based on determining that the password included in the one or more login credentials does not match a valid password of the at least two valid passwords which have been defined for the user account, customer security computing platform 310 may generate and/or send an error message (e.g., to the computing device that submitted the access request).

Alternatively, if customer security computing platform 310 determines, at step 14, that the one or more login credentials included in and/or otherwise associated with the access request received by customer security computing platform 310 at step 13 are valid, then at step 16, customer security computing platform 310 may determine an access level to be provided (e.g., to the computing device from which the access was received and/or to a user of such a computing device) based on the one or more login credentials included in and/or otherwise associated with the access request. For example, based on determining that the password included in the one or more login credentials matches a valid password of the at least two valid passwords which have been defined for the user account, customer security computing platform 310 may determine, based on the password included in the one or more login credentials, an access level to be provided (e.g., to the computing device that submitted the access request and/or to a user of the computing device that submitted the access request).

In determining an access level to be provided (e.g., at step 16), customer security computing platform 310 may, for instance, determine what access level may have been assigned to and/or otherwise associated with the particular password included in and/or otherwise associated with the access request that has been received. For example, if the password included in the access request has been assigned to and/or otherwise associated with a "full access" access level, customer security computing platform 310 may determine to provide full access to the computing device that submitted the access request and/or to a user of such a computing device. As discussed below, such full access may enable the computing device that submitted the access request and/or a user of the computing device to view information associated with the user account, create and/or modify such information, execute one or more functions, and/or perform other actions. In instances where the user account is associated with an online banking interface, such full access may enable the computing device that submitted the access request and/or a user of the computing device to view account information, request and/or complete one or more transactions (e.g., bill payment transactions, money transfer transactions, and/or the like), open and/or close accounts, create and/or modify account settings and/or user information, and/or perform any other actions that may be enabled by the online banking interface.

Alternatively, if the password included in the access request has been assigned to and/or otherwise associated with a "read-only access" access level, customer security computing platform 310 may determine to provide read-only access to the computing device that submitted the access request and/or to a user of such a computing device. As discussed below, such read-only access may enable the computing device that submitted the access request and/or a user of the computing device to view information associated with the user account, but may prevent the computing device that submitted the access request and/or a user of the computing device from creating and/or modifying the information associated with the user account, and may further prevent the computing device that submitted the access request and/or a user of the computing device from executing one or more functions and/or performing other actions. In instances where the user account is associated with an online banking interface, such read-only access may enable the computing device that submitted the access request and/or a user of the computing device to view account information, such as account balance information and/or transaction history information, but may prevent the computing device that submitted the access request and/or a user of the computing device from requesting and/or completing one or more transactions (e.g., bill payment transactions, money transfer transactions, and/or the like), opening and/or closing accounts, creating and/or modifying account settings and/or user information, and/or performing other specific actions that might otherwise be provided via the online banking interface. Additionally or alternatively, if the password included in the access request has been assigned to and/or otherwise associated with another access level, customer security computing platform 310 may determine to provide access to the computing device that submitted the access request and/or to a user of such a computing device in accordance with one or more parameters associated with the particular access level that has been assigned to and/or otherwise associated the password included in the access request.

At step 17, customer security computing platform 310 may provide access to the user account based on the determined access level. For example, customer security computing platform 310 may allow and/or enable the computing device that submitted the access request and/or a user of the computing device that submitted the access request to access and/or otherwise interact with the user account in accordance with the access level determined at step 16. In allowing and/or enabling the computing device that submitted the access request and/or a user of the computing device that submitted the access request to access and/or otherwise interact with the user account, customer security computing platform 310 may, for example, allow and/or prevent the computing device that submitted the access request and/or a user of the computing device that submitted the access request to view information associated with the user account, modify information associated with the user account, execute one or more functions associated with the user account, and/or perform one or more other actions in connection with the user account in accordance with the determined access level and/or the parameters associated with the access level (which, e.g., was determined to be provided at step 16).

In some instances, providing access to the user account may include presenting an online banking user interface and/or a mobile banking user interface (e.g., in instances where the computing device that submitted the access request is a mobile device, such as a smart phone, tablet computer, wearable device, and/or other type of mobile computing device). Additionally or alternatively, in instances where the user account is associated with an online banking interface, providing access to the user account based on the determined access level may, for example, include allowing and/or preventing the computing device that submitted the access request and/or a user of the computing device that submitted the access request to view information via, execute one or more commands on, and/or otherwise interact with an online banking interface. For instance, providing read-only access to a user account that is associated with an online banking interface may include allowing, enabling, and/or otherwise permitting a computing device or a user of a computing device to view account information, while not allowing, disabling, and/or otherwise preventing the computing device or the user of the computing device from conducting transactions, modifying accounts and/or account settings, and/or making other changes to the user account and/or one or more financial accounts that may be linked to and/or otherwise associated with the user account. On the other hand, providing full access to a user account that is associated with an online banking interface may include allowing, enabling, and/or otherwise permitting a computing device or a user of a computing device to view account information, conduct transactions, modify accounts and/or account settings, and/or make other changes to the user account and/or one or more financial accounts that may be linked to and/or otherwise associated with the user account. If, for example, an authorized user of a user account has defined a duress password that has been assigned to and/or otherwise associated with a duress access level, a duress mode may be provided if the duress password is received. In the duress mode, customer security computing platform 310 may, for example, present user interfaces that simulate one or more transactions being conducted, while preventing actual transactions from being executed and/or otherwise preventing any actual changes from being made to the user account and/or one or more financial accounts linked to the user account.

In some embodiments, a first valid password of the at least two valid passwords may be associated with a first access level, and a second valid password of the at least two valid passwords may be associated with a second access level different from the first access level. For example, one password of the at least two valid passwords that may be defined for the user account may be assigned to and/or otherwise associated with a "read-only" access level, and a different password of the at least two valid passwords that may be defined for the user account may be assigned to and/or otherwise associated with a "full" access level.

In some embodiments, the at least two valid passwords may be associated with a single username linked to the user account, and the username may also be included in the one or more login credentials. For example, an authorized user of the user account may submit the same username along with any of the valid passwords that may be defined for the user account in order to access the user account. The access level that will then be provided may correspond to the access level that has been assigned to and/or otherwise associated with the particular password that was submitted with the username included in the access request.

In some embodiments, the user account may be associated with a customer portal that is provided by an organization operating the customer security computing platform. For example, the user account to which access is requested may be used in accessing a customer portal that is provided by an organization (e.g., a retailer, an airline, a consulting firm, and so on) via customer security computing platform 310. In other embodiments, the user account may be associated with a customer portal that is provided by a financial institution operating the customer security computing platform. For example, the user account to which access is requested may be used in accessing a customer portal that is provided by a financial institution (e.g., a bank, credit union, brokerage firm, credit card network, and so on) via customer security computing platform 310.

In some embodiments, providing access to the user account based on the determined access level may include causing at least one online banking user interface to be presented. For example, in providing access to the user account based on the determined access level, customer security computing platform 310 may present an online banking interface and/or cause such an online banking interface to be presented (e.g., by and/or on the computing device that submitted the access request), as illustrated in the examples discussed above.

In some embodiments, read-only access may be provided via the at least one online banking user interface based on the password included in the one or more login credentials. For example, in presenting an online banking interface and/or causing such an online banking interface to be presented, customer security computing platform 310 may provide read-only access to a user account via the at least one online banking user interface based on a password received by customer security computing platform 310 in connection with a request to access the user account. Additionally, the read-only access may, in some embodiments, allow account information to be presented via the at least one online banking user interface and/or may prevent one or more transactions from being conducted via the at least one online banking user interface, as illustrated in the examples discussed above. Additionally or alternatively, the read-only access may, in some embodiments, be provided to a financial planning system provided by an organization different from the financial institution. For example, a user of a user account may define a password that is assigned to and/or otherwise associated with read-only access, and the user may subsequently share the password with a financial planning system (e.g., third-party financial planning and/or management software, tax software, and/or the like) that is provided by and/or otherwise associated with an organization different from the financial institution (which may, e.g., maintain one or more financial accounts linked to the user account for the user of the user account).

In some embodiments, full access may be provided via the at least one online banking user interface based on the password included in the one or more login credentials. For example, in presenting an online banking interface and/or causing such an online banking interface to be presented, customer security computing platform 310 may provide full access to a user account via the at least one online banking user interface based on a password received by customer security computing platform 310 in connection with a request to access the user account. Additionally, the full access may, in some embodiments, allow account information to be presented via the at least one online banking user interface and/or may allow one or more transactions to be conducted via the at least one online banking user interface. For example, the full access may allow funds to be transferred between accounts via the online banking user interface, bills to be paid via the online banking user interface, and/or other transactions involving one or more financial accounts linked to the user account to be requested and/or executed via the online banking user interface. Additionally or alternatively, the full access may, in some embodiments, be provided to a computer system used by an authorized user of the user account. For example, the full access may be provided to a computing device being used by the customer of the financial institution (who may, e.g., have defined the at least two passwords for the user account) to enable the customer of the financial institution to view their account information, conduct one or more transactions using one or more financial accounts maintained by the financial institution and linked to the customer's user account, and/or otherwise interact with their user account.

Figure 7:
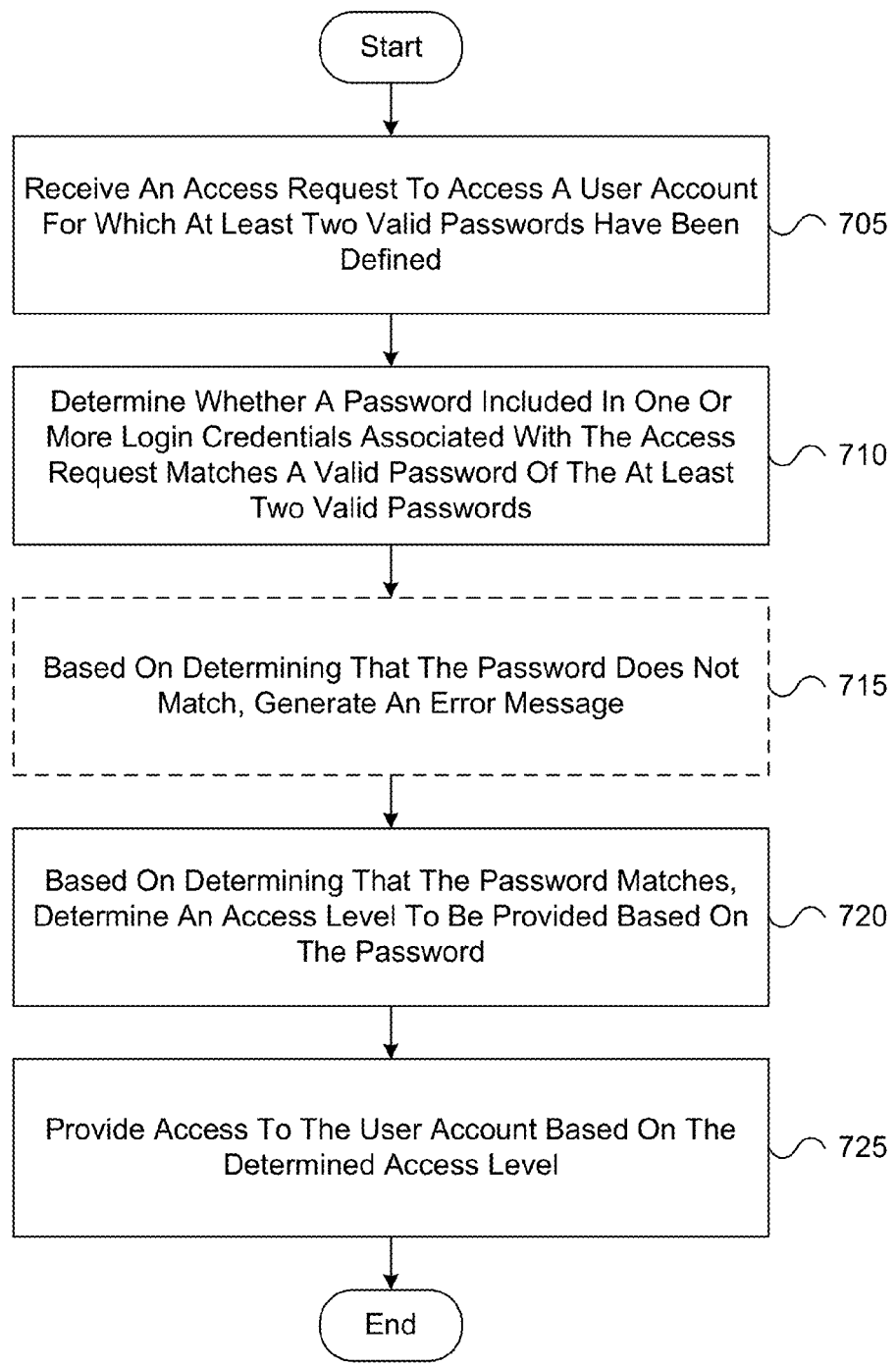
FIG. 7 depicts an illustrative method for providing multiple access levels to a single user account using different login credentials in accordance with one or more example embodiments.

FIG. 7 depicts an illustrative method for providing multiple access levels to a single user account using different login credentials in accordance with one or more example embodiments. Referring to FIG. 7, at step 705, an access request to access a user account for which at least two valid passwords have been defined may be received by a computing platform. At step 710, the computing platform may determine whether a password included in one or more login credentials associated with the access request matches a valid password of the at least two valid passwords which have been defined for the user account. If the computing platform determines that the password included in the one or more login credentials associated with the access request does not match a valid password of the at least two valid passwords which have been defined for the user account, then at step 715, the computing platform may generate and/or send an error message. Alternatively, if the computing platform determines that the password included in the one or more login credentials associated with the access request matches a valid password of the at least two valid passwords which have been defined for the user account, then at step 720, the computing platform may determine an access level to be provided based on the password that was included in the one or more login credentials associated with the access request. Subsequently, at step 725, the computing platform may provide access to the user account based on the determined access level. For example, in providing such access, the computing platform may allow a computing device that submitted the access request and/or a user of such a computing device to access and/or view information, execute one or more functions, perform one or more transactions, and/or otherwise interact with the user account in accordance with the access level that may be defined for and/or otherwise associated with the password that was included in the one or more login credentials associated with the access request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, memory, and a communication interface:
   receiving, by the at least one processor, via the communication interface, and from a computing device, an access request to access a user account for which at least two valid passwords have been defined, the access request including one or more login credentials, and the user account being associated with a customer portal that is provided by a financial institution operating the computing platform;
   determining, by the at least one processor, whether a password included in the one or more login credentials matches a valid password of the at least two valid passwords;
   responsive to determining, by the at least one processor, that the password included in the one or more login credentials matches a valid password of the at least two valid passwords:
   determining, by the at least one processor, and based on the password included in the one or more login credentials, an access level of the user account to be provided to the computing device; and
   providing, by the at least one processor, and to the computing device, access to the user account based on the determined access level,
   wherein providing access to the user account based on the determined access level includes causing at least one online banking user interface to be presented,
   wherein read-only access is provided via the at least one online banking user interface based on the password included in the one or more login credentials,
   wherein the read-only access allows account information to be presented via the at least one online banking user interface and prevents one or more transactions from being conducted via the at least one online banking user interface, and
   wherein the read-only access is provided to a financial planning system which is provided by an organization different from the financial institution.

2. The method of claim 1,
   wherein a first valid password of the at least two valid passwords is associated with a first access level, and
   wherein a second valid password of the at least two valid passwords is associated with a second access level different from the first access level.

3. The method of claim 1,
   wherein the at least two valid passwords are associated with a single username linked to the user account, and
   wherein the username is also included in the one or more login credentials.

4. The method of claim 1, wherein full access is provided via the at least one online banking user interface when a second password is included in the one or more login credentials.

5. The method of claim 4, wherein the full access allows account information to be presented via the at least one online banking user interface and allows one or more transactions to be conducted via the at least one online banking user interface.

6. The method of claim 4, wherein the full access is provided to a computer system used by an authorized user of the user account.

7. The method of claim 1, wherein the financial planning system comprises third-party financial planning and management software.

8. The method of claim 1, wherein the financial planning system comprises third-party tax software.

9. The method of claim 1, wherein the account information comprises account balance information and account history information for one or more financial accounts linked to the user account and maintained by the financial institution.

10. The method of claim 1, wherein at least one valid password of the at least two valid passwords is a duress password that is associated with a duress access level in which the computing platform causes one or more user interfaces that simulate transactions being conducted to be presented.

11. The method of claim 1, wherein an authorized user of the user account has shared the password with the organization different from the financial institution.

12. A system, comprising:
   at least one processor;
   a communication interface communicatively coupled to the at least one processor; and memory storing computer-readable instructions that, when executed by the at least one processor, cause the system to:
receive, via the communication interface, from a computing device, an access request to access a user account for which at least two valid passwords have been defined, the access request including one or more login credentials, and the user account being associated with a customer portal that is provided by a financial institution operating the system;
determine whether a password included in the one or more login credentials matches a valid password of the at least two valid passwords which have been defined for the user account;
based on determining that the password included in the one or more login credentials matches a valid password of the at least two valid passwords which have been defined for the user account, determine, based on the password included in the one or more login credentials, an access level to be provided; and
provide access to the user account based on the determined access level,
wherein providing access to the user account based on the determined access level includes causing at least one online banking user interface to be presented,
wherein read-only access is provided via the at least one online banking user interface based on the password included in the one or more login credentials,
wherein the read-only access allows account information to be presented via the at least one online banking user interface and prevents one or more transactions from being conducted via the at least one online banking user interface, and
wherein the read-only access is provided to a financial planning system which is provided by an organization different from the financial institution.

13. The system of claim 12,
wherein a first valid password of the at least two valid passwords is associated with a first access level, and
wherein a second valid password of the at least two valid passwords is associated with a second access level different from the first access level.

14. The system of claim 12,
wherein the at least two valid passwords are associated with a single username linked to the user account, and
wherein the username is also included in the one or more login credentials.

15. The system of claim 12, wherein full access is provided via the at least one online banking user interface when a second password is included in the one or more login credentials.

16. The system of claim 15, wherein the full access allows account information to be presented via the at least one online banking user interface and allows one or more transactions to be conducted via the at least one online banking user interface.

17. The system of claim 15, wherein the full access is provided to a computer system used by an authorized user of the user account.

18. The system of claim 12, wherein the financial planning system comprises third-party financial planning and management software.

19. The system of claim 12, wherein the financial planning system comprises third-party tax software.

20. The system of claim 12, wherein the account information comprises account balance information and account history information for one or more financial accounts linked to the user account and maintained by the financial institution.

21. The system of claim 12, wherein at least one valid password of the at least two valid passwords is a duress password that is associated with a duress access level in which the system causes one or more user interfaces that simulate transactions being conducted to be presented.

22. The system of claim 12, wherein an authorized user of the user account has shared the password with the organization different from the financial institution.

23. One or more non-transitory computer-readable media storing instructions that, when executed by a computing platform comprising at least one processor, memory, and a communication interface, cause the computing platform to:
receive, via the communication interface, from a computing device, an access request to access a user account for which at least two valid passwords have been defined, the access request including one or more login credentials, and the user account being associated with a customer portal that is provided by a financial institution operating the computing platform;
determine whether a password included in the one or more login credentials matches a valid password of the at least two valid passwords which have been defined for the user account;
based on determining that the password included in the one or more login credentials matches a valid password of the at least two valid passwords which have been defined for the user account, determine, based on the password included in the one or more login credentials, an access level to be provided; and
provide access to the user account based on the determined access level,
wherein providing access to the user account based on the determined access level includes causing at least one online banking user interface to be presented,
wherein read-only access is provided via the at least one online banking user interface based on the password included in the one or more login credentials,
wherein the read-only access allows account information to be presented via the at least one online banking user interface and prevents one or more transactions from being conducted via the at least one online banking user interface, and
wherein the read-only access is provided to a financial planning system which is provided by an organization different from the financial institution.

24. The one or more non-transitory computer-readable media of claim 23,
wherein a first valid password of the at least two valid passwords is associated with a first access level, and
wherein a second valid password of the at least two valid passwords is associated with a second access level different from the first access level.

25. The one or more non-transitory computer-readable media of claim 23,
wherein the at least two valid passwords are associated with a single username linked to the user account, and
wherein the username is also included in the one or more login credentials.

26. The one or more non-transitory computer-readable media of claim 23, wherein full access is provided via the at least one online banking user interface when a second password is included in the one or more login credentials.

27. The one or more non-transitory computer-readable media of claim 26, wherein the full access allows account information to be presented via the at least one online banking user interface and allows one or more transactions to be conducted via the at least one online banking user interface.

28. The one or more non-transitory computer-readable media of claim 26, wherein the full access is provided to a computer system used by an authorized user of the user account.

29. The one or more non-transitory computer-readable media of claim 23, wherein the financial planning system comprises third-party financial planning and management software.

30. The one or more non-transitory computer-readable media of claim 23, wherein the financial planning system comprises third-party tax software.

31. The one or more non-transitory computer-readable media of claim 23, wherein the account information comprises account balance information and account history information for one or more financial accounts linked to the user account and maintained by the financial institution.

32. The one or more non-transitory computer-readable media of claim 23, wherein at least one valid password of the at least two valid passwords is a duress password that is associated with a duress access level in which the computing platform causes one or more user interfaces that simulate transactions being conducted to be presented.

33. The one or more non-transitory computer-readable media of claim 23, wherein an authorized user of the user account has shared the password with the organization different from the financial institution.

* * * * *